(12) United States Patent
Araki et al.

(10) Patent No.: US 10,421,283 B2
(45) Date of Patent: Sep. 24, 2019

(54) EJECTION MATERIAL RECEIVING UNIT, EJECTION MATERIAL EJECTING APPARATUS, AND MANUFACTURING METHOD OF FLEXIBLE MEMBER

(71) Applicant: CANON KABUSHIKI KAISHA, Tokyo (JP)

(72) Inventors: Yoshimasa Araki, Utsunomiya (JP); Yutaka Mita, Utsunomiya (JP); Masahiro Kuri, Utsunomiya (JP); Noriyasu Hasegawa, Utsunomiya (JP); Tsuyoshi Arai, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/118,147

(22) Filed: Aug. 30, 2018

(65) Prior Publication Data

US 2019/0070857 A1    Mar. 7, 2019

(30) Foreign Application Priority Data

Sep. 6, 2017 (JP) ................................ 2017-171535
Oct. 31, 2017 (JP) ................................ 2017-210908
May 29, 2018 (JP) ................................ 2018-102556

(51) Int. Cl.
*B41J 2/175* (2006.01)
*B29C 51/10* (2006.01)
(Continued)

(52) U.S. Cl.
CPC ............... *B41J 2/175* (2013.01); *B29C 51/10* (2013.01); *B41J 2/16* (2013.01); *B41J 2/17513* (2013.01);
(Continued)

(58) Field of Classification Search
CPC .... B41J 2/175; B41J 2/17513; B41J 2/17553; B41J 2/17566; B41J 2/16;
(Continued)

(56) References Cited

U.S. PATENT DOCUMENTS 6,082,851 A    7/2000  Shihoh et al. ................ 347/85
6,293,662 B1   9/2001  Shihoh et al. ................ 347/86
(Continued)

FOREIGN PATENT DOCUMENTS

CN      1405002     3/2003
CN    106042650    10/2016
(Continued)

OTHER PUBLICATIONS

TW Office Action dated Mar. 7, 2019 in counterpart TW Application No. 107129077.
(Continued)

*Primary Examiner* — Lisa Solomon
(74) *Attorney, Agent, or Firm* — Venable LLP

(57) ABSTRACT

There is provided an ejection material receiving unit capable of increasing the filling amount of ejection material with as little enlargement of the container itself as possible and an ejection material ejecting apparatus including the unit. Therefore, an ejection material receiving unit includes: a first receiving space capable of receiving ejection material; a second receiving space capable of receiving liquid; and a flexible member separating the first receiving space and the second receiving space, and is characterized in that the flexible member has a concave part which takes a concave shape in a state where the first receiving space is not filled with the ejection material and the second receiving space is not filled with the liquid, and the concave shape is a shape dented toward the second receiving space from the first (Continued)

receiving space, and is also a shape conforming to a wall forming the second receiving space.

20 Claims, 15 Drawing Sheets

(51) Int. Cl.
*B41J 2/16* (2006.01)
*B29L 7/00* (2006.01)
*B29C 51/26* (2006.01)
*B29C 51/04* (2006.01)
*B29C 51/36* (2006.01)

(52) U.S. Cl.
CPC ....... *B41J 2/17553* (2013.01); *B41J 2/17566* (2013.01); *B29C 51/04* (2013.01); *B29C 51/262* (2013.01); *B29C 51/36* (2013.01); *B29C 51/365* (2013.01); *B29C 2791/006* (2013.01); *B29L 2007/001* (2013.01); *B41J 2002/17579* (2013.01)

(58) Field of Classification Search
CPC .......... B41J 2002/17579; B29C 51/262; B29C 51/10; B29L 2007/001
See application file for complete search history.

(56) References Cited

U.S. PATENT DOCUMENTS

| | | | |
|---|---|---|---|
| 6,431,699 B2 | 8/2002 | Shihoh et al. | 347/86 |
| 9,475,303 B2 | 10/2016 | Araki et al. | B41J 2/17566 |
| 2003/0184627 A1 | 10/2003 | Sasaki et al. | 347/86 |
| 2009/0027435 A1 | 1/2009 | Katada | 347/14 |
| 2010/0079562 A1 | 4/2010 | Katada et al. | 347/85 |
| 2015/0097900 A1* | 4/2015 | Araki | B29C 59/16 347/85 |
| 2016/0214390 A1 | 7/2016 | Nozawa et al. | B41J 2/17553 |
| 2016/0288378 A1 | 10/2016 | Arai et al. | G03F 7/0002 |
| 2016/0288521 A1 | 10/2016 | Araki et al. | B41J 2/17596 |

FOREIGN PATENT DOCUMENTS

| | | |
|---|---|---|
| JP | 2008-105360 | 5/2008 |
| JP | 2015-092549 | 5/2015 |
| JP | 2015-160318 | 9/2015 |
| JP | 2015-163439 | 9/2015 |

OTHER PUBLICATIONS

SG Office Action dated Mar. 25, 2019 in counterpart SG Application No. 10201807623T.

* cited by examiner

EJECTION MATERIAL RECEIVING UNIT, EJECTION MATERIAL EJECTING APPARATUS, AND MANUFACTURING METHOD OF FLEXIBLE MEMBER

BACKGROUND OF THE INVENTION

Field of the Invention

The present invention relates to an ejection material receiving unit which receives ejection material, an ejection material ejecting apparatus which ejects the ejection material stored in the ejection material receiving unit, and a manufacturing method of a flexible member.

Description of the Related Art

Japanese Patent Laid-Open No. 2008-105360 has described therein an ink reservoir mounted on a liquid ejection apparatus which ejects liquid (ink) as ejection material. The ink reservoir separates the interior of the container into an ink chamber and a buoyancy generating chamber with a flexible member in order to reduce pressure variation in heads, and further includes a floater connected to the ink chamber.

SUMMARY OF THE INVENTION

The ejection material receiving unit includes: a first receiving space capable of receiving ejection material to be ejected from an eject head; a second receiving space which is adjacent to the first receiving space and capable of receiving liquid; and a flexible member separating the first receiving space and the second receiving space, and is characterized in that the flexible member has a concave part which takes a concave shape in a state where the first receiving space is not filled with the ejection material and the second receiving space is not filled with the liquid, and the concave shape is a shape dented toward the second receiving space from the first receiving space, and is also a shape conforming to a wall forming the second receiving space.

Further features of the present invention will become apparent from the following description of exemplary embodiments with reference to the attached drawings.

DESCRIPTION OF THE EMBODIMENTS

Figure 1:
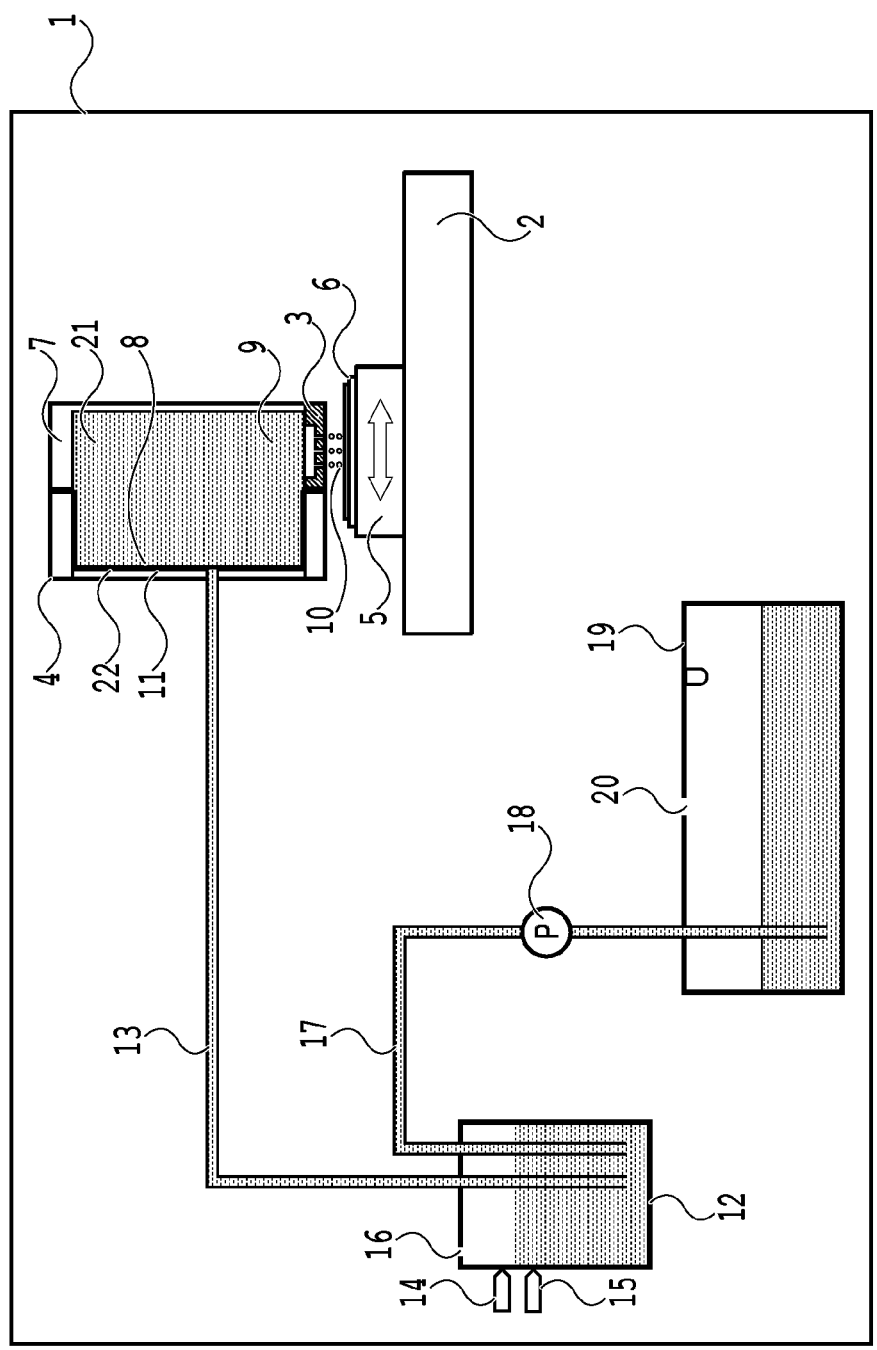
FIG. 1 illustrates main parts of an ejection material ejecting apparatus.

According to the method of Japanese Patent Laid-Open No. 2008-105360, since a buoyancy generating chamber and a floater must be provided in the ejection material (ink) reservoir, preventing storage of ink in the part between the buoyancy generating chamber and the floater, it is difficult to the use the capacity of the container effectively without waste. As a result, there is a problem that the container itself must be enlarged in order to increase the filling amount of the ejection material to be ejected.

The present invention therefore provides an ejection material receiving unit capable of increasing the filling amount of ejection material to be ejected with as little enlargement of the container itself as possible and an ejection material ejecting apparatus including the unit.

First Embodiment

In the following, a first embodiment of the present invention will be described, referring to the drawings.

FIG. 1 illustrates the main parts of an ejection material ejecting apparatus 1 to which the present embodiment may be applied. The ejection material ejecting apparatus 1 includes a main tank 19 configured to store operating liquid 11 in liquid phase, a sub tank 12 configured to store the operating liquid 11 supplied from the main tank 19, an ejection material receiving unit 4 to which the operating liquid 11 is supplied from the sub tank 12, and a conveying part 5 which conveys a medium 6. The main tank 19 has an atmosphere communication hole 20 being in communication with the atmosphere, the main tank 19 and the sub tank 12 being connected via a flow path 17. The flow path 17 includes a pump 18 in the middle thereof. The sub tank 12 and the ejection material receiving unit 4 are connected via the flow path 13.

The sub tank 12 has an upper liquid surface sensor 14 and a lower liquid surface sensor 15, the sensors detecting the operating liquid surface in the sub tank 12. The upper liquid surface sensor 14 and the lower liquid surface sensor 15 may be any sensor capable of detecting the liquid surface level in the sub tank 12. For example, an electrode may be provided in the sub tank 12 so as to detect a flow of electric current due to liquid contact to the electrode.

In addition, the liquid surface level in the sub tank 12 may be detected by a capacitive sensor. The operating liquid 11 stored in the main tank 19 is supplied to the sub tank 12 via the flow path 17 by operation of the pump 18, and supplied from the sub tank 12 to the ejection material receiving unit 4 via the flow path 13. There may be mentioned, as an example of the pump 18, a syringe pump, a tube pump, a diaphragm pump, a gear pump, or the like. However, it suffices that the pump 18 functions as a liquid feeding device, it is possible to select a liquid feeding device suitable for the ejection material ejecting apparatus 1, without being limited to a pump.

The ejection material receiving unit 4 includes a sealed housing 7 and a flexible member 8 provided in the housing 7. The flexible member 8 separates the first receiving space 21 and the second receiving space 22 in the housing 7. In addition, the ejection material receiving unit 4 includes a head (ejection head) 3. The head 3, installed in a part of the first receiving space 21, is in communication with the first receiving space 21. The first receiving space 21 and the second receiving space 22 are adjacent with each other, and the first receiving space 21 is a space capable of receiving the ejection material.

In addition, the first receiving space 21 and the second receiving space 22 are plane-symmetric with respect a plane to which the flexible member 8 is coupled. The head 3 is capable of ejecting the ejection material received in the first receiving space 21 onto the medium 6. Note that the head 3 may be provided separately with the ejection material receiving unit 4. For example, the head 3 may be provided outside the ejection material receiving unit, with the head 3 being in communication with the first receiving space 21 via a tube or a flow path in the housing.

The flexible member 8 has a concave-shaped concave part at least on a part thereof. The concave part takes a concave shape in a state where the first receiving space 21 is not filled with the ejection material and the second receiving space 22 is not filled with liquid (operating liquid). It is preferred that the flexible member 8 is already concave-shaped at the molding stage, and it is preferred to form a concave shape by molding, for example. It is preferred that the concave shape remains as a concave shape in a no-load state. It turns out that the flexible member 8, having a concave part being concave-shaped before assembly with the ejection material receiving unit, is assembled with the ejection material receiving unit. Therefore, in a state where the first receiving space 21 and the second receiving space 22 are not filled with the ejection material or liquid and the flexible member 8 has a part being in contact with air only, the part turns out to take a concave shape. The concave shape is dented toward the second receiving space 22 from the first receiving space 21. In addition, the concave shape is a shape conforming to a wall forming the second receiving space 22.

The concave-shaped concave part forms a part of the first receiving space 21 by intruding into the second receiving space 22 in a manner conforming to a part of the wall of the housing 7 forming the second receiving space 22. The flexible member 8 is deformable and its deforming allows for expanding the second receiving space 22 by intruding into the first receiving space 21 in a manner conforming to a part of wall of the housing 7 forming the first receiving space 21. The flexible member 8 is capable of deforming into a convex shape conforming to the wall forming the first receiving space 21, particularly as the amount of ejection material received in the first receiving space 21 decreases. In a state where the second receiving space 22 has expanded most, the capacity of the first receiving space 21 has been substantially lost.

Figure 2:
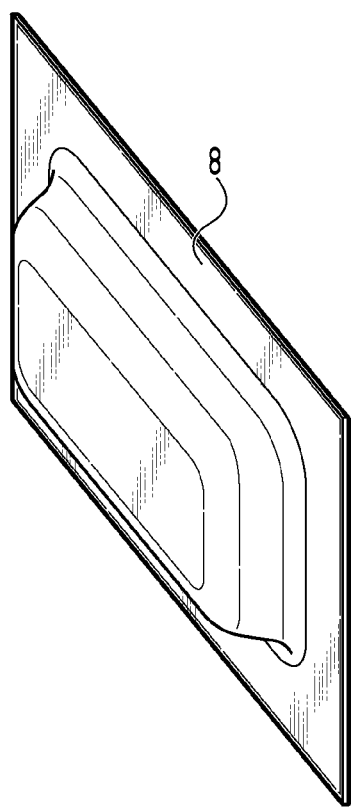
FIG. 2 is a perspective view illustrating a flexible member.

FIG. 2 is a perspective view illustrating the flexible member 8. As illustrated in FIG. 2, the flexible member 8 includes a concave-shaped concave part in accordance with the shape of the housing 7. As a molding method of the flexible member 8, there may be mentioned thermal molding while applying heat. For example, vacuum molding while applying heat, blow molding while applying heat, casting molding while applying heat, or the like, may be mentioned as an examples. However, any molding method suitable for the material and required shape of the flexible member 8 may be selected without being limited to those mentioned above. The corner or nook of the flexible member 8 may have a curved shape or a tapered shape provided thereon. In this manner it becomes possible to facilitate deformation of the flexible member 8. The internal shape of the first receiving space 21 and the second receiving space 22 may be fabricated into a shape that conforms to the shape of the flexible member 8.

Ink may be mentioned as an example of ejection material 9 received in the first receiving space 21 and ejected from the head 3. As the ink, there may be mentioned various types of ink such as conductive ink, UV curing ink, or the like. Additionally, in the manufacturing process of a semiconductor device or the like, there is a so-called imprint technique, which causes a mold having a pattern formed thereon to contact imprint material on a substrate and transferring the shape of the mold on the imprint material to form the pattern. Resist such as light-curing resin, heat-curing resin, or the like, is used as the imprint material, and such imprint material may be mentioned as the ejection material 9.

The operating liquid 11, which is the liquid to be filled in the second receiving space 22, is less affected than gas in terms of volume by variation of external temperature and pressure. Therefore, the volume of the operating liquid 11 exhibits little variation even when the temperature or atmospheric pressure around the ejection material ejecting apparatus 1 varies, thereby suppressing variation of pressure of the ejection material 9 in the first receiving space 21.

With regard to the flexible member 8, it is preferred to select a member suitable for the characteristics of the ejection material 9 in terms of liquid contact property, or the like. The difference between the density of the ejection material 9 and the density of the operating liquid 11 usually turns out to be small in comparison with the difference between the density of the ejection material 9 and the density of gas. Making the difference between the density of the material received in the first receiving space 21 and the density of the material filled in the second receiving space 22 smaller allows for suppressing the fluctuation of the flexible member 8 when an impact is applied to the housing 7. As an example of the present embodiment, it is possible to set the capacity of the housing 7 to 500 ml, the initial amount of the ejection material 9 to about 500 ml, and the initial amount of the operating liquid 11 to about 0 ml. Note that the present invention is not limited thereto and it is possible to determine the capacity of the housing 7, the initial amount of the ejection material 9, and the initial amount of the operating liquid 11 as appropriate.

Figure 3:
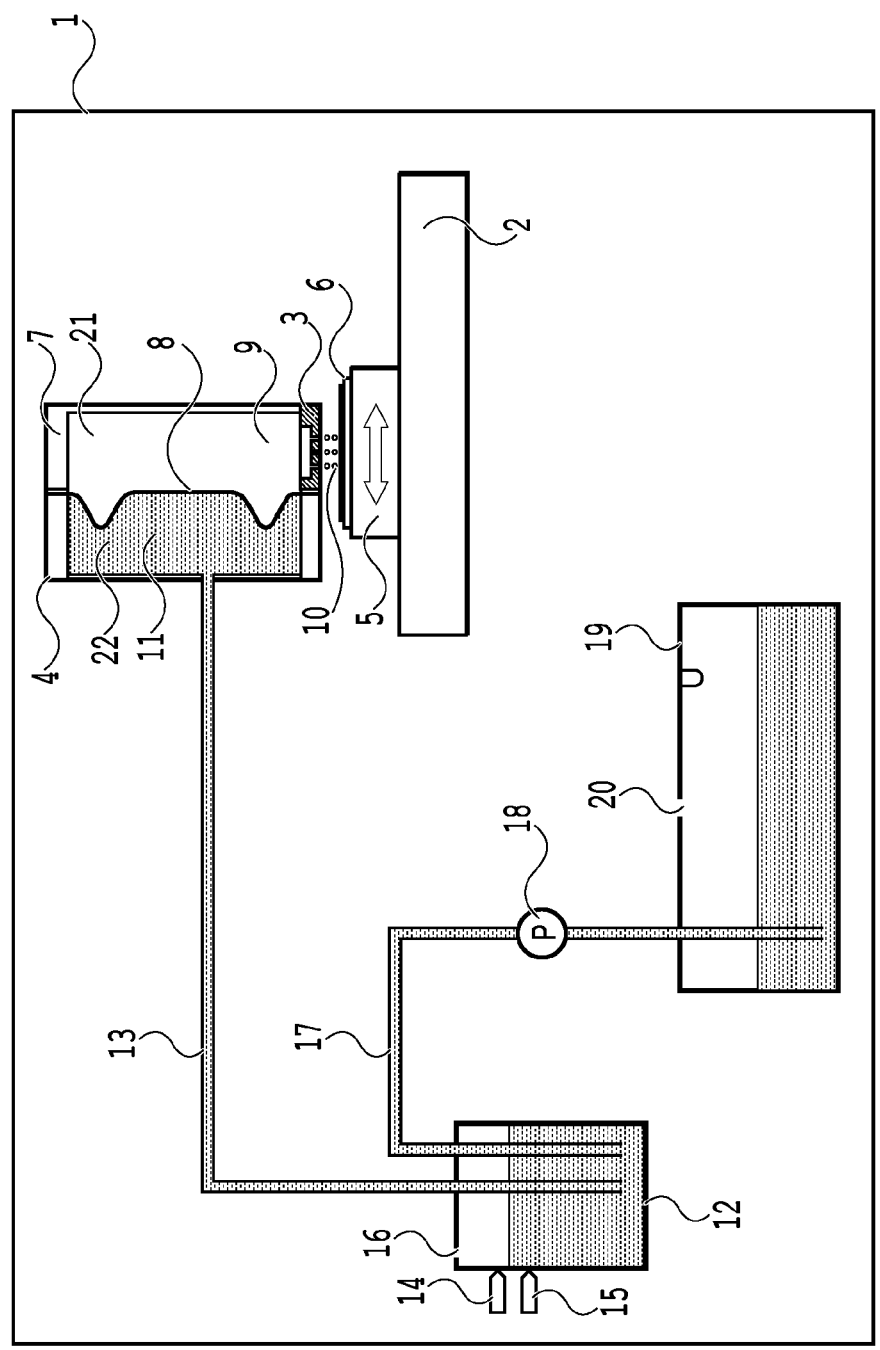
FIG. 3 illustrates the main parts of the ejection material ejecting apparatus.

FIG. 3, illustrating the main parts of the ejection material ejecting apparatus 1, is a transition diagram indicating that ejection of the ejection material 9 from the head 3 causes the amount of the ejection material 9 stored in the first receiving space 21 to decrease. Upon ejecting the ejection material 9 in the first receiving space 21 from the head 3, the first receiving space 21 contracts as the ejection material 9 stored in the first receiving space 21 decreases. Along with contraction of the first receiving space 21, the second receiving space 22 expands. The second receiving space 22 is configured to allow operating liquid to be supplied thereto from outside, so that when the second receiving space 22 expands, the operating liquid 11 stored in the sub tank 12 is supplied to the second receiving space 22 due to the negative pressure in the second receiving space 22.

When the operating liquid 11 stored in the sub tank 12 is supplied to the second receiving space 22, the liquid surface level of the operating liquid 11 stored in the sub tank 12 drops, and the lower liquid surface sensor 15 detects that a liquid surface level has dropped. Upon detecting by the lower liquid surface sensor 15 that the liquid surface level has dropped, the pump 18 supplies the operating liquid 11 from the main tank 19 to the sub tank 12. As a result, the liquid surface height of the operating liquid 11 stored in the sub tank 12 rises. Subsequently, upon detecting by the upper liquid surface sensor 14 that the liquid surface level has risen, the pump 18 terminates the liquid delivery operation. Accordingly, supplying the operating liquid 11 into the second receiving space 22 allows for maintaining the pressure in the first receiving space 21 at a predetermined pressure (pressure control).

Figure 4:
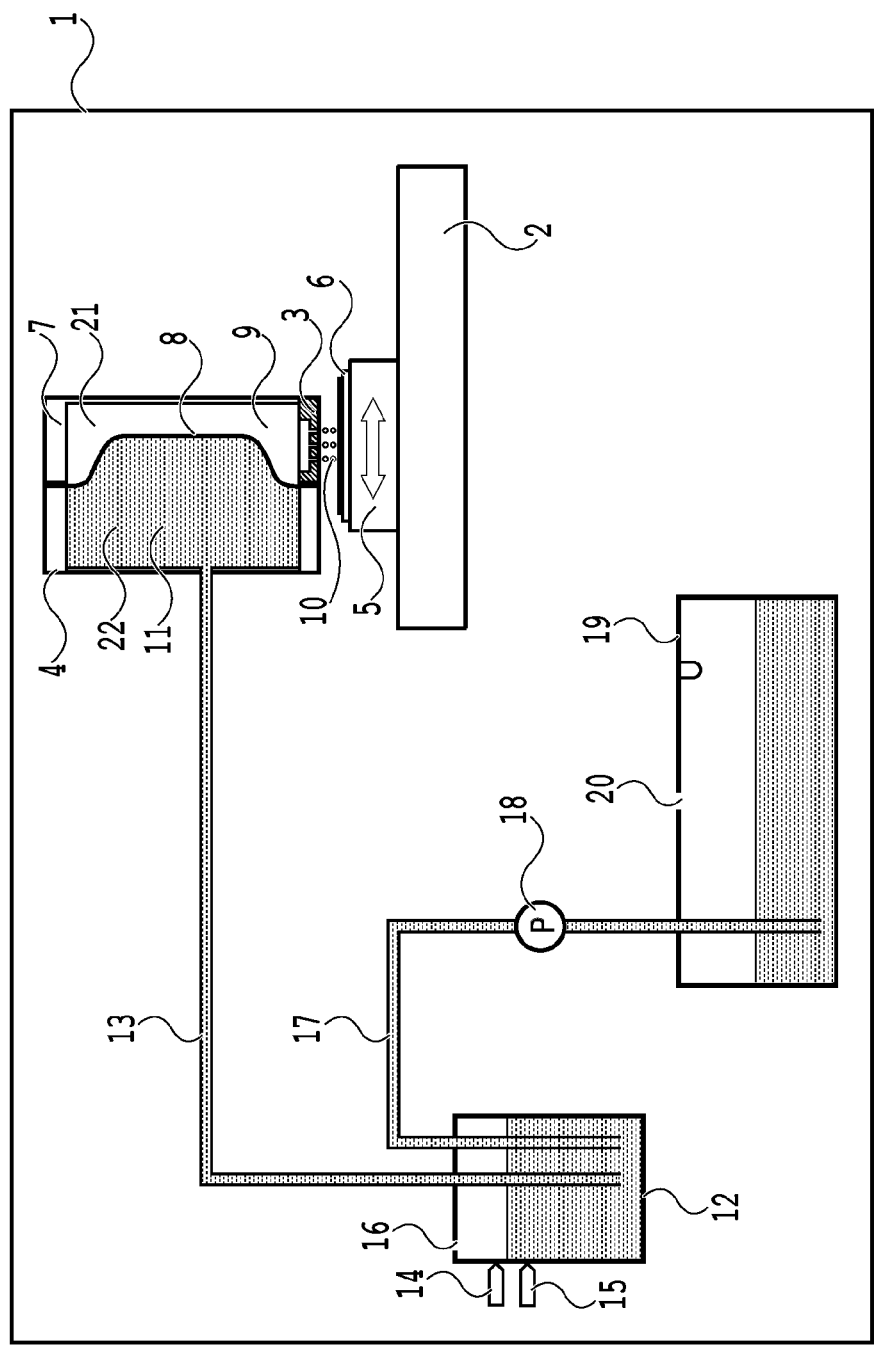
FIG. 4 illustrates the main parts of the ejection material ejecting apparatus.
Figure 5:
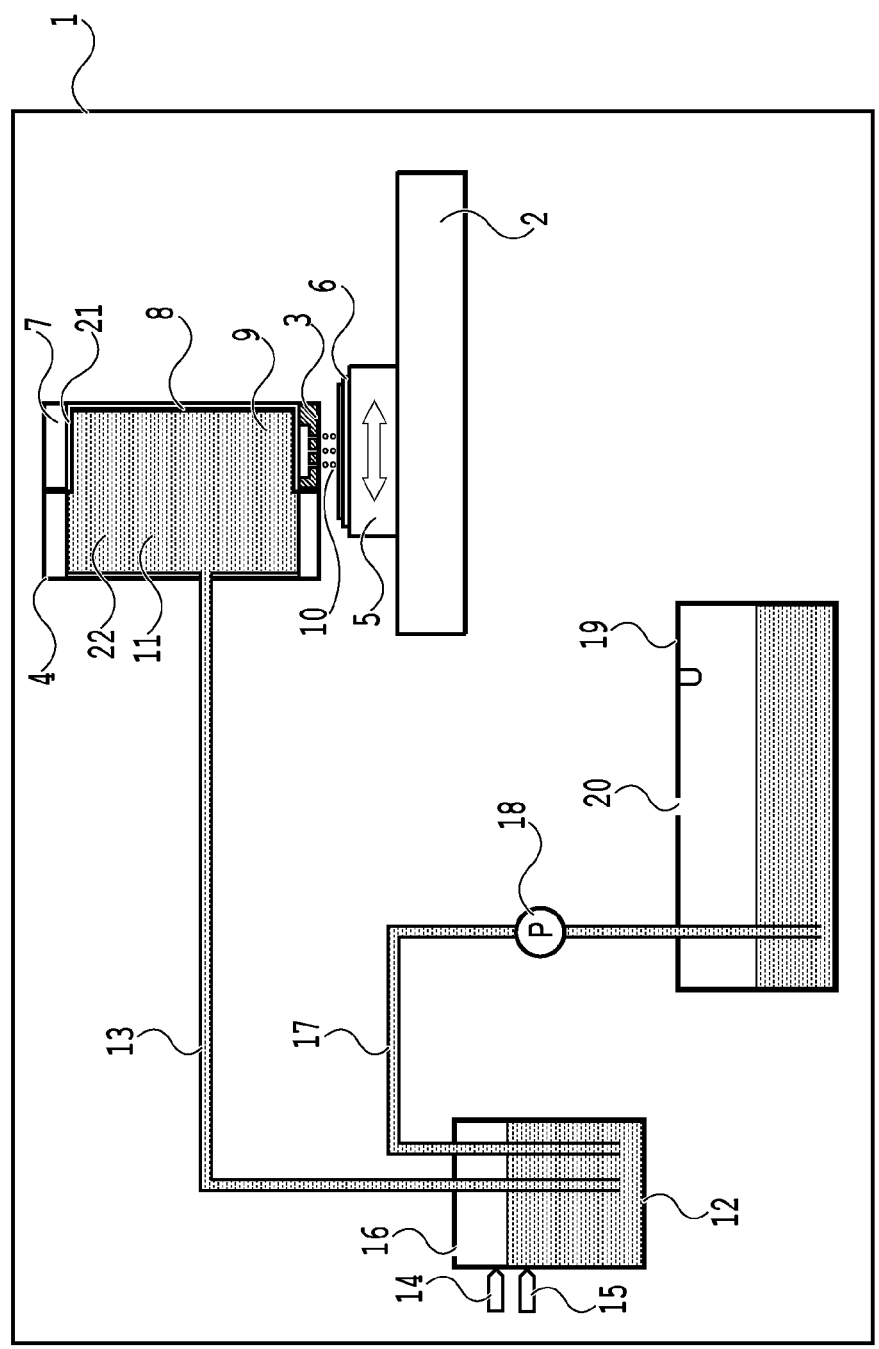
FIG. 5 illustrates the main parts of the ejection material ejecting apparatus.

FIGS. 4 and 5 illustrate the main parts of the ejection material ejecting apparatus 1, FIG. 4 being a transition diagram indicating that the amount of the ejection material 9 stored in the first receiving space 21 has further decreased than in FIG. 3, and FIG. 5 being a transition diagram indicating that the amount of the ejection material 9 in the first receiving space 21 has further decreased than in FIG. 4. It can be seen in FIG. 4 that the central part of the flexible member 8 has deformed in a manner significantly intruding into the first receiving space 21, whereby the first receiving space 21 has contracted. Along with contraction of the first receiving space 21, the operating liquid 11 is supplied to the second receiving space 22, whereby the second receiving space 22 expands.

In FIG. 5, the flexible member 8 has deformed into a convex shape conforming to the wall (inner wall) of the first receiving space 21, with the ejection material 9 in the first receiving space 21 having almost been ejected and exhausted by the head 3, and the capacity of the first receiving space having decreased to almost zero. Therefore, a groove which causes the first receiving space 21 and the head 3 to be in communication may be provided in the housing 7 which causes the first receiving space 21 and the head 3 to be in communication when the flexible member 8 has deformed into the convex shape. Providing a groove allows for preventing the flexible member 8 from blocking the flow path from the first receiving space 21 to the head 3.

Second Embodiment

In the following, a second embodiment of the present invention will be described, referring to the drawings. Note that the basic configuration of the present embodiment is similar to that of the first embodiment and therefore only characteristic components will be described below.

Figure 6:
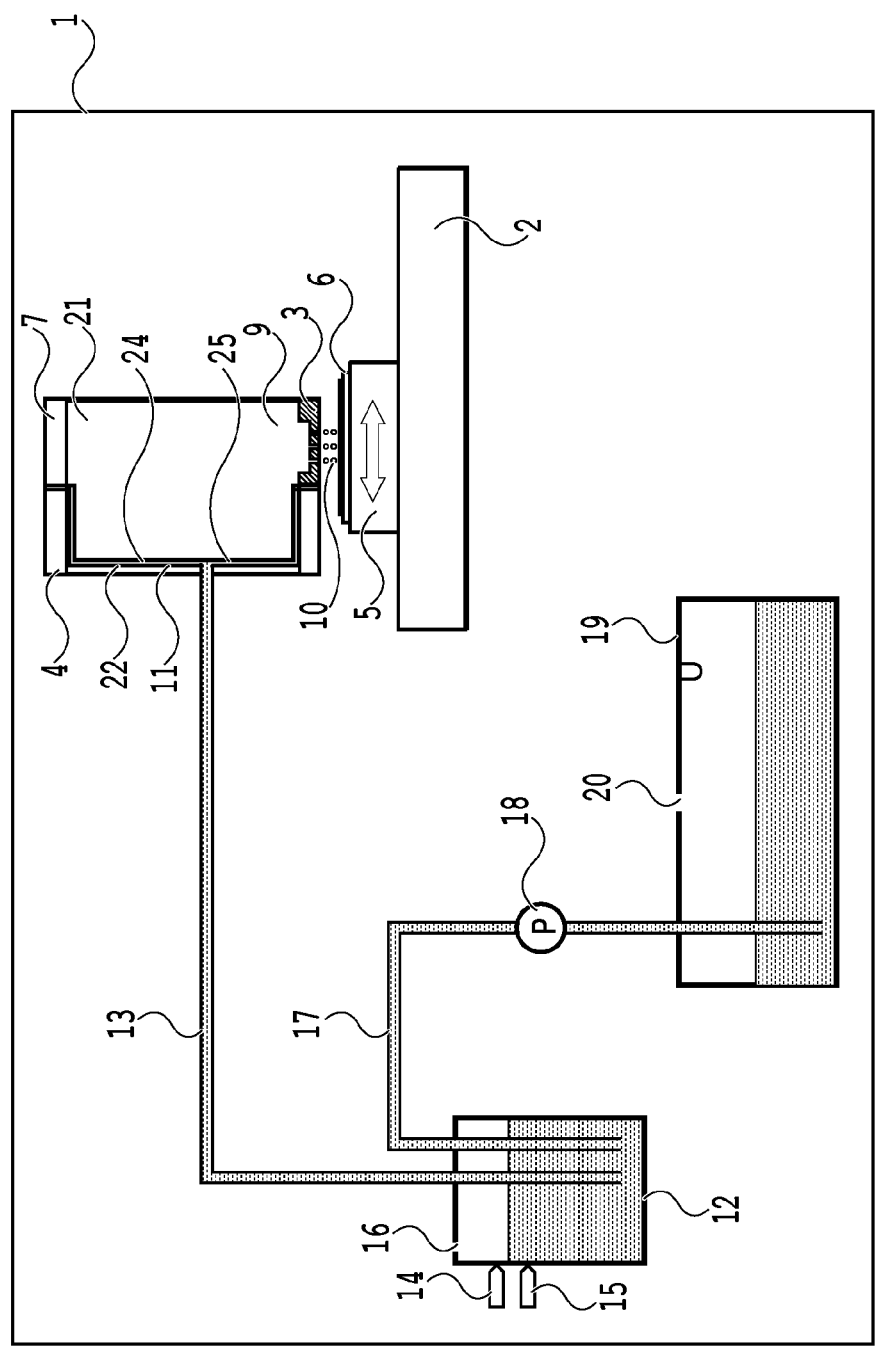
FIG. 6 illustrates the main parts of the ejection material ejecting apparatus.

FIG. 6 illustrates the main parts of the ejection material ejecting apparatus 1 in the present embodiment. The flexible members included in the ejection material receiving unit 4 of the present embodiment includes two flexible members, namely a first flexible member 25 and a second flexible member 24. Inclusion of the first flexible member 25 and the second flexible member 24 as described above allows for preventing the first receiving space 21 and the second receiving space from being in communication with each other because, even when one of the flexible members is damaged for some reason, the other flexible member may function as a substitute.

Note that although a configuration including two flexible members, namely the first flexible member 25 and the second flexible member 24 has been described in the present embodiment, this is not limiting and there may also be a configuration including more than two flexible members. In a case of providing more than two flexible members, it is necessary to consider the thickness of the flexible members so that their operation is not constrained when being deformed.

Note that, in order to prevent the flexible member from being damaged, it is conceivable to increase the thickness of flexible member. However, increasing the thickness of flexible member may constrain the operation of the flexible member when being deformed, whereby the desired deformation state may not be obtained. Therefore, a configuration including a plurality of flexible members such as that of the present embodiment is preferred.

Third Embodiment

In the following, a third embodiment of the present invention will be described, referring to the drawings. Note that the basic configuration of the present embodiment is similar to that of the first embodiment and therefore only characteristic components will be described below.

Figure 7:
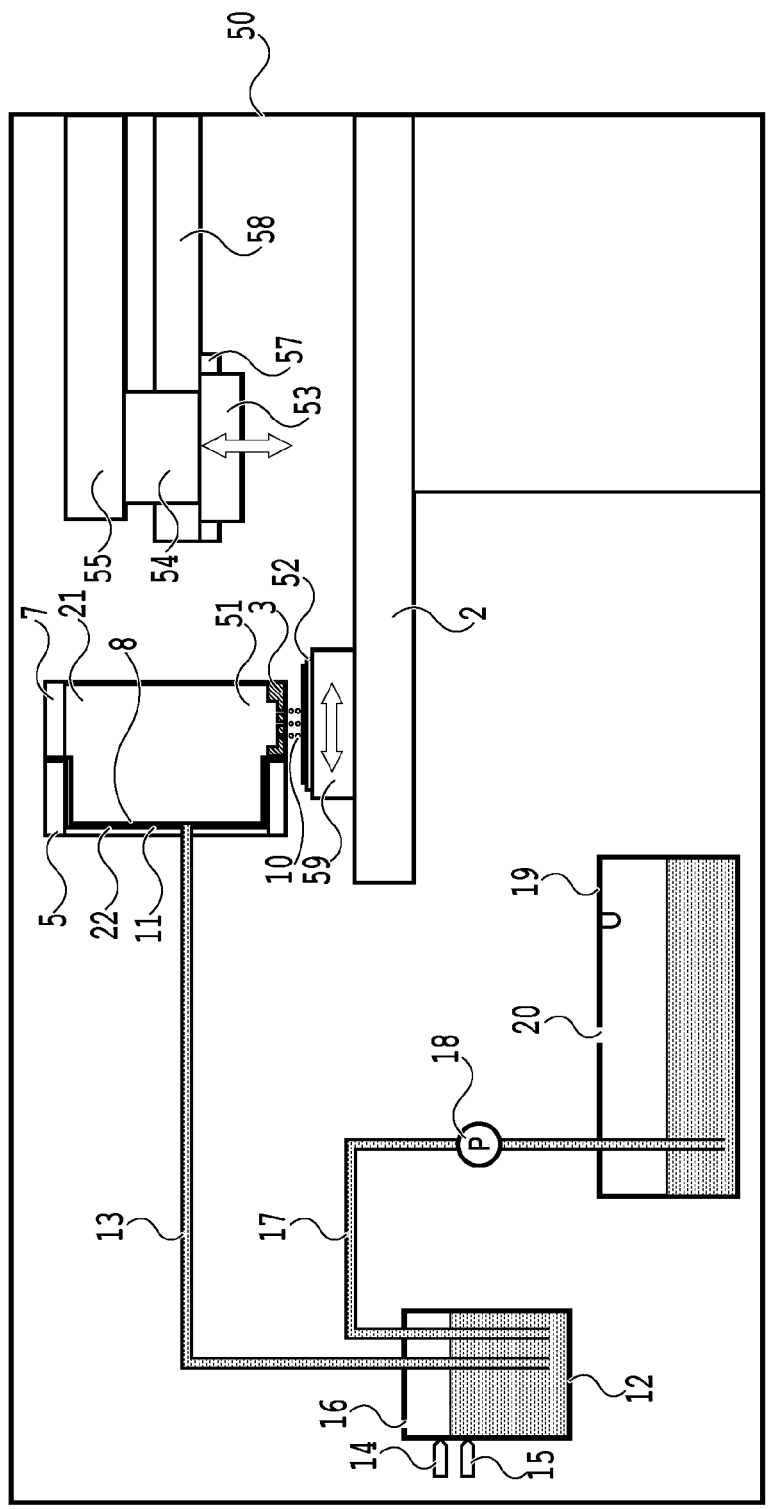
FIG. 7 illustrates the main parts of an imprint device.

FIG. 7 illustrates the main parts of an imprint device 50 in the present embodiment. The imprint device 50 includes the head 3, a resist receiving unit 56 which receives resist (resin) as imprint material, and the sub tank 12. The ejection material to be ejected from the head 3 is light curing resist 51, which is the imprint material. In the imprint device 50, a mold 53 being formed of quartz and having a micro pattern formed thereon is supported by a mold supporting part 58 via a mold moving part 57.

The mold 53 is configured to be movable vertically by the mold moving part 57. There is provided an exposure unit 54 which radiates ultraviolet beams on the resist 51 ejected onto a wafer 52 via the mold 53. The exposure unit 54 is supported by an exposure unit support part 55. The resist 51 ejected from the head 3 onto the wafer 52 is coated on the wafer 52. The imprint device 50 described above forms a micro pattern and therefore is also referred to as a nanoimprint device.

The wafer 52 having the resist 51 coated thereon is moved to the lower part of the mold 53 by a wafer conveying part 59. Subsequently, the resist 51 coated over the wafer 52 drives the mold moving part 57 to move the mold 53 downward, so as to be pressed by the mold 53 formed of quartz and filled in the micro pattern formed on the mold 53. Radiating ultraviolet beams on the resist 51 from the exposure unit 54 through the mold 53 after the resist 51 has been filled in the micro pattern forms a micro pattern in accordance with the resist 51. Driving the mold moving part 57 to move the mold 53 upward after the micro pattern has been formed causes the mold 53 to move away from the formed micro pattern. The imprint device 50 forms the micro pattern on the wafer 52 via such steps.

As thus described, the imprint device 50 is configured so as to include the head 3, the resist receiving unit 56, and the sub tank 12. The aforementioned ejection material receiving unit then is used as the resist receiving unit 56. Accordingly, it becomes possible to effectively utilize the space inside the resist receiving unit 56. It becomes possible to suppress variation of pressure inside the large-capacity resist receiving unit 56. As a result, it becomes possible to increase the filling amount of the resist 51 to be ejected without increasing the size of the housing 7 of the resist receiving unit 5, and it becomes possible to down-size the resist receiving unit 56 and down-size the imprint device 50.

Fourth Embodiment

In the following, a fourth embodiment of the present invention will be described, referring to the drawings. Note that the basic configuration of the present embodiment is similar to that of the first embodiment and therefore only characteristic components will be described below.

Figure 8:
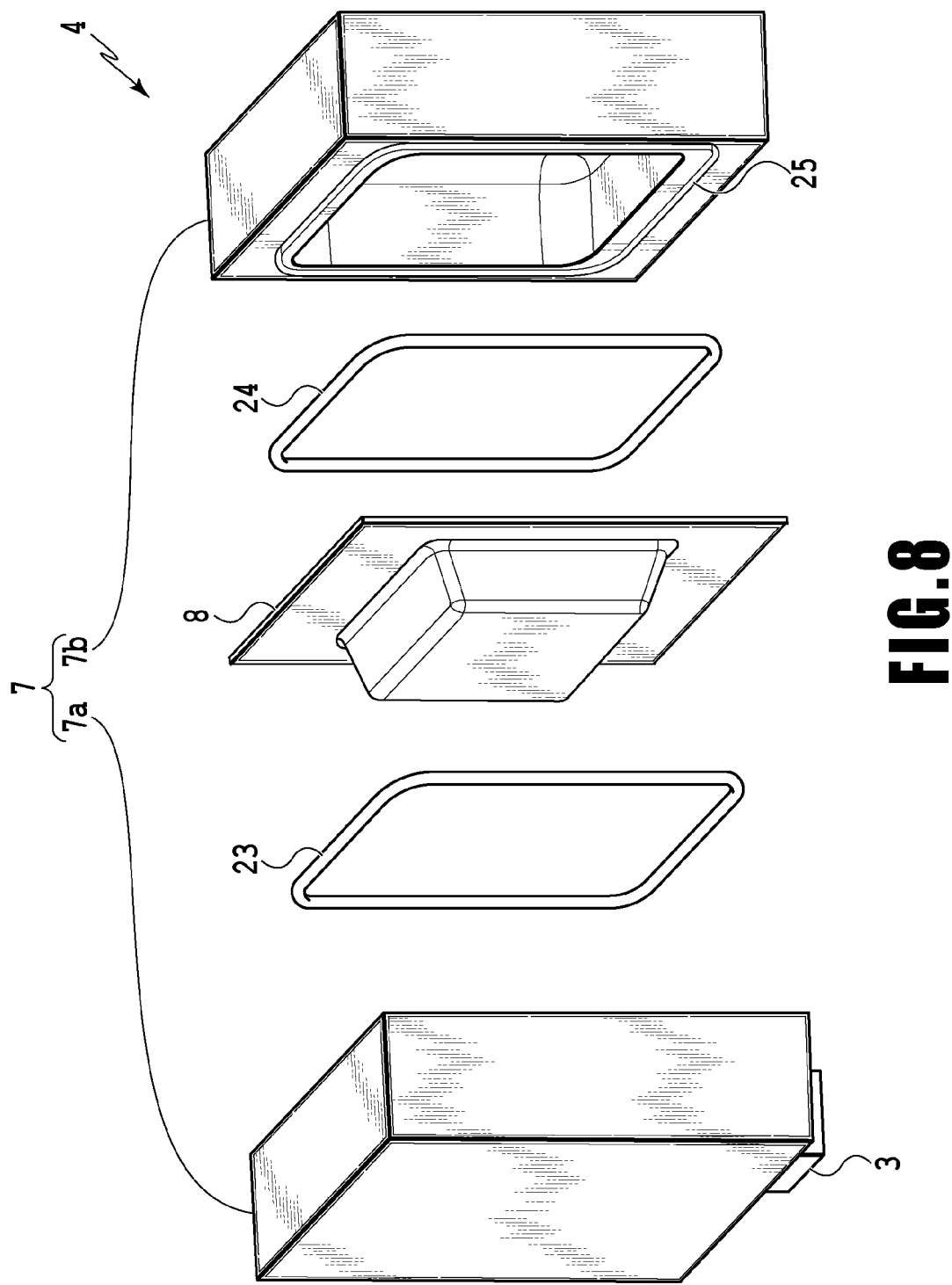
FIG. 8 is an exploded perspective view of an ejection material receiving unit.

FIG. 8 is an exploded perspective view of the ejection material receiving unit 4. The ejection material receiving unit 4 is configured so that the housing 7 (7a, 7b) sandwiches the flexible member 8. The ejection material receiving unit 4 is configured so that the space between the housing 7 (7a, 7b) and the flexible member 8 is sealed with O-rings 23 and 24, each being a sealing member (encapsulating member) provided on the aperture periphery of the housing 7 (7a, 7b). Abutting of the sealing member (encapsulating member) and the flexible member 8 forms a fluid receiving space. The flexible member 8 is a member covering the receiving space. Note that, an elastic member such as an O-ring, a gasket, or the like is preferred as the sealing member (encapsulating member).

In addition, adhesive or liquid sealant is also applicable. The flexible member 8 has been molded to have a convex-shaped convex part so as to conform to the shape of the convex part of the housing 7 (7a, 7b). The thickness of the flexible member 8 is about 10 μm to 200 μm. The convex part, being formed on the part covering the receiving space, is a deformable part. The aperture periphery of the housing 7 (7a, 7b) has provided thereon a groove 25 for inserting the O-rings 23 and 24 therein, so that the ejection material receiving unit 4 is obtained by inserting the O-rings 23 and 24 into the groove 25 in manner sandwiching the flexible member 8 and fastening them with a screw or the like.

Note that although two O-rings 23 and 24 are used in the present embodiment, only one of which may be provided on one side of the flexible member 8 since the flexible member 8 has elasticity. In addition, although the O-rings 23 and 24 are provided at a same position in a manner facing each other in the present embodiment, they may be provided at different positions such as the interior and the exterior.

With regard to the flexible member 8, it is preferred to select a member suitable for the characteristics of the ejection material 9 in terms of liquid contact property, or the like. In the present embodiment, the flexible member 8 has applied thereto a thin film of a fluoric resin material. With regard to the quality of material of the flexible member 8, it is desired to be formed of a material having tolerance against the resist or the operating liquid 11 to be in contact therewith. For example, fluorine resin materials such as PFA, ETFE, PTFE are preferred. In addition to the foregoing materials, polyamide synthetic resin such as, for example, PE (polyethylene), PVC (polyvinyl chloride), PET (polyethylene terephthalate), PVAL (polyvinyl alcohol), PVDC (polyvinylidene chloride), nylon may be mentioned. The film may be a multi-layer film having such materials formed into a plurality of layers, or may be formed by pasting two sheets of film by welding or adhesion.

Figure 9A:
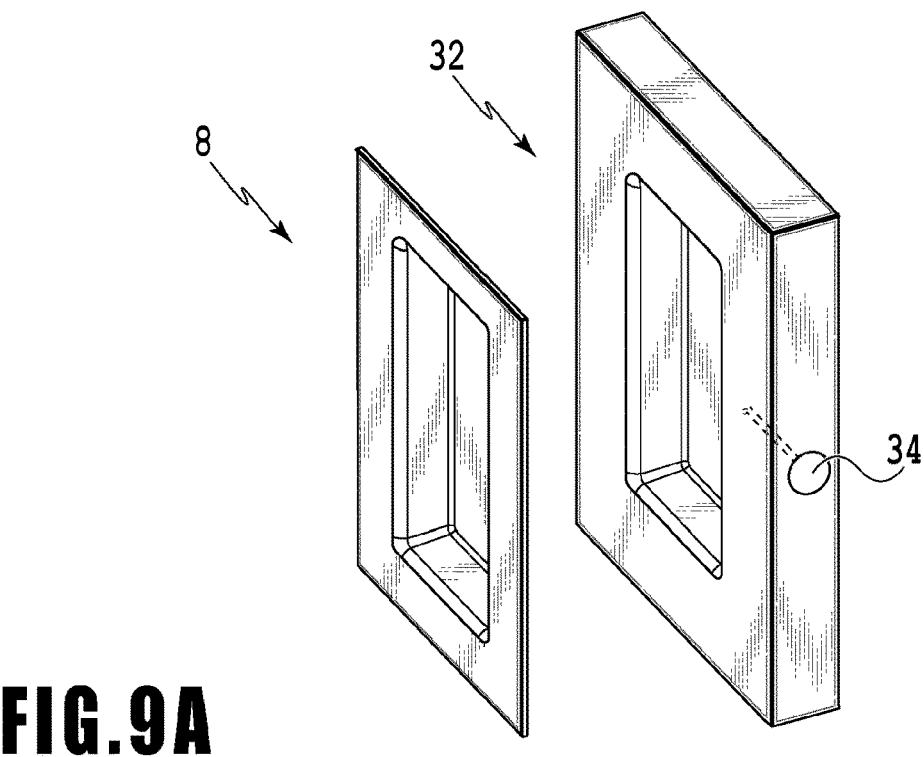
FIG. 9A illustrates a flexible member and a casting mold.
Figure 9B:
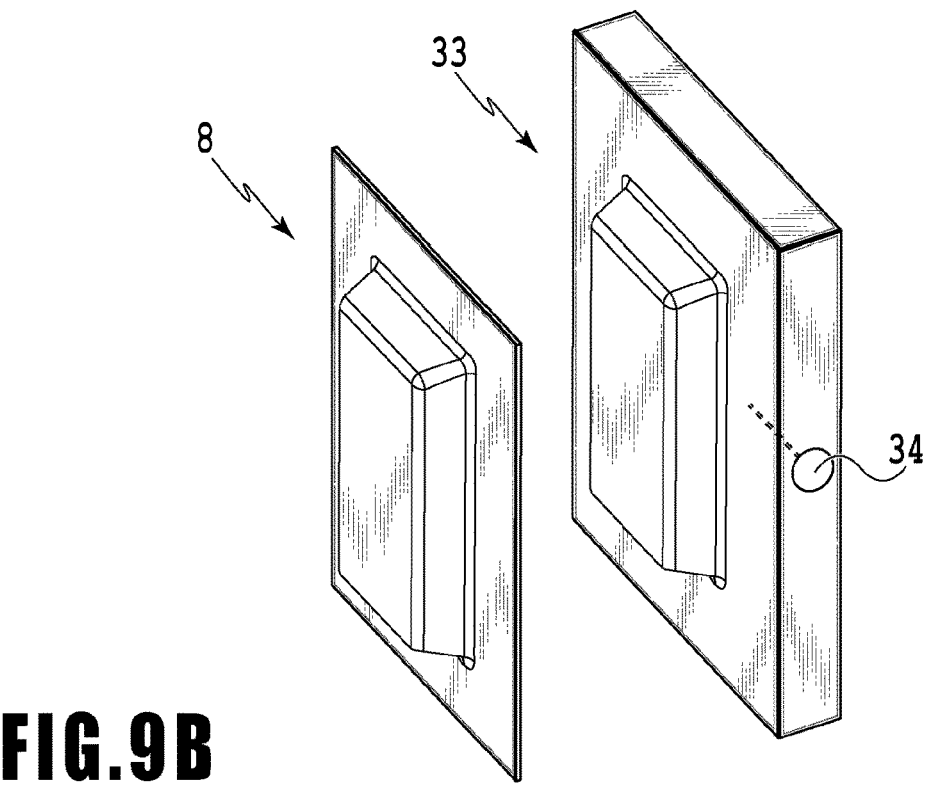
FIG. 9B illustrates the flexible member and the casting mold.

FIGS. 9A and 9B illustrate the flexible member 8 formed by molding, a concave casting mold 32, and a convex casting mold 33. The flexible member 8 is a thin film and therefore it is optimal to be molded into a desired shape by vacuum molding. Therefore, an absorption path 34 is provided in the concave casting mold 32 and the convex casting mold 33 for evacuating air when performing molding. Either the concave casting mold 32 illustrated in FIG. 9A or the convex casting mold 33 illustrated in FIG. 9B may be used for molding of the flexible member 8. In the following, an example using the convex casting mold 33 will be described.

Figure 10A:
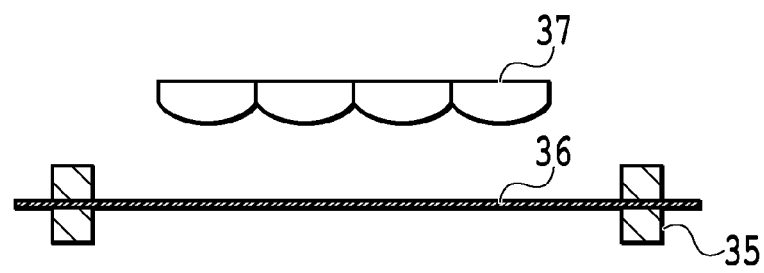
FIG. 10A illustrates a step of vacuum molding using a convex casting mold.
Figure 10B:
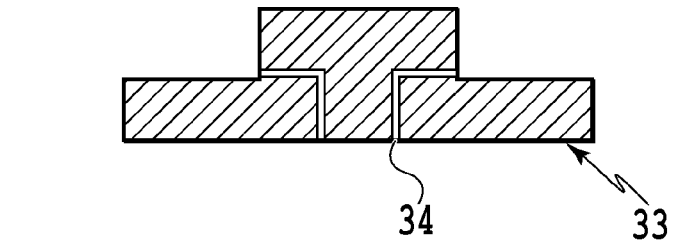
FIG. 10B illustrates a step of vacuum molding using the convex casting mold.

FIGS. 10A to 10D illustrate steps of vacuum molding using the convex casting mold 33 in the present embodiment. In the present embodiment, the flexible member 8 is formed by vacuum-molding a film 36. In the following, processing in each step will be described. First, as illustrated in FIG. 10A, a sheet-like film 36 before molding is cut into an appropriate size, the entire periphery of the film 36 being held by a clamp 35. Subsequently, the film 36 is heated by a heater 37 up to a temperature at which the resin forming the film 36 is softened. On this occasion, it is preferred that the casting mold 33 is similarly heated by the heater. Subsequently, as illustrated in FIG. 10B, the film 36 which has been softened by the heat of the heater 37 is caused to come in contact with the casting mold 33. In other words, the film 36 is molded on the casting mold 33. On this occasion, the film 36 may also be caused to be in contact with the casting mold 33 after having been expanded and stretched by compressed air.

Figure 10C:
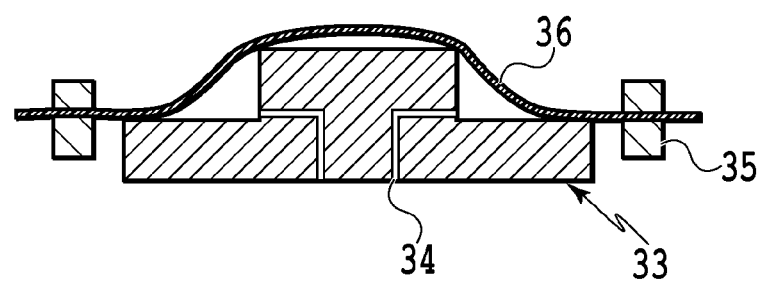
FIG. 10C illustrates a step of vacuum molding using the convex casting mold.

Subsequently, as illustrated in FIG. 10C, air in the region between the film 36 and the casting mold 33 is absorbed and exhausted from a plurality of vacuum absorption ports 38 provided in the casting mold 33 via the absorption path 34 which is a vacuum absorption path during molding of the film 36 on the casting mold 33. Absorbing and exhausting the air in the region between the film 36 and the casting mold 33 reduces the size of the region (the tent-shaped part), whereby the film 36 is molded so as to conform to the shape of the convex part of the convex casting mold 33. The region of the film 36 corresponding to the region having the convex part of the flexible member is a second region, which is a different region from a first region described below. In other words, the step is a second region molding step, which is a step of molding the second region of the film. The film 36 is stretched as a whole and locally so that the resin flows. Accordingly, the thickness of the film 36 becomes uneven, whereby wrinkles or deflection may occur locally. However, it is preferred that the flexible member 8 obtained by molding the film 36 in the present embodiment has as less wrinkles or deflection as possible in the part to which the sealing member abuts in order to prevent fluid leakage between the flexible member 8 and the container material using the sealing members (O-rings 23 and 24) as described above.

Figure 10D:
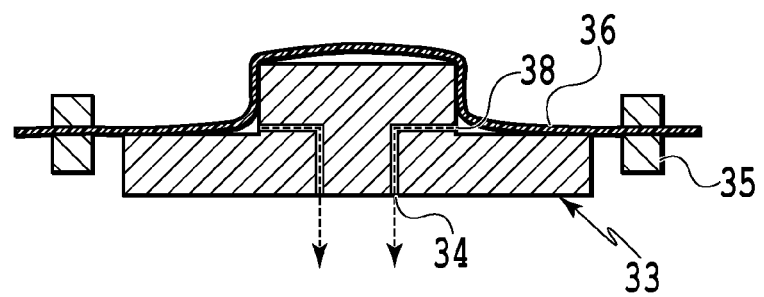
FIG. 10D illustrates a step of vacuum molding using the convex casting mold.

In the present embodiment, therefore, an absorption port 39 is further provided besides the vacuum absorption port 38, as illustrated in FIG. 10D. The casting mold 33 has provided therein the vacuum absorption port 38 which absorbs air in the region between the film 36 and the casting mold 33, the absorption port 39 which adsorbs and holds the part to become a flange in the flexible member 8 of the film, and a flow path 40 being in communication with and the absorption port 39. The region of the film corresponding to the part of the flexible member to become the flange (the part abutting the sealing member) turns out to be the first region. The absorption port 39, which is provided in the part of the casting mold 33 corresponding to the part which abuts the sealing member when it becomes the flexible member 8, absorbs and holds the film 36 on the casting mold 33 during the molding process. As thus described, molding (the first region molding step) by absorbing and holding the first region of the film 36 which is the part to become the flange in the flexible member 8 allows for preventing wrinkles or a deflection from occurring on the flexible member 8 which is the final product of the molding process. Note that although the absorption port 39 may not necessarily be provided in the casting mold 33, it is preferred to be provided on the casting mold.

Note that a molding absorption system relating to the vacuum absorption port 38 and absorption path 34, and a holding absorption system relating to the absorption port 39 and flow path 40 may simultaneously absorb as a same piping system. In addition, there may be a configuration such that the molding absorption system and the holding absorption system may perform absorption in a time-shifted manner, each absorption system being individually controlled. With vacuum molding, wrinkles or a deflection may occur in the course of cooling the molded film 36 or the casting mold. Accordingly, the holding absorption system and the molding absorption system may be individually controlled in the cooling process to vary the absorption force. For example, the film may be held by the holding absorption system only in the cooling process to prevent occurrence of wrinkles or a deflection on a sealing member abutting surface 30 during the cooling process. Additionally, in the cooling process, there may be provided a step of holding the film 36 by the holding absorption system and not absorbing by the molding absorption system. Occurrence of wrinkles or deflection on a part of the film other than the sealing member abutting surface 30 thereby releases the distortion inside the film, and allows for improved molding of the sealing member abutting surface which requires highly precise molding.

In addition, it is also possible to perform secondary processing on the molded film remaining adsorbed on the casting mold 33. For example, when welding on the molded film a member such as another film, the welding process may be performed keeping the sealing member abutting surface of the molding-completed film absorbed by the holding absorption system. Since the sealing member abutting surface of the film remains being held on the casting mold after completion of molding, it is possible to perform a second processing with the quality of the sealing member abutting surface being maintained.

Furthermore, in the present embodiment, although a configuration such that the molding absorption system (the vacuum absorption port 38 and the absorption path 34) used for vacuum molding exists only at a nook of the casting mold 33 has been described, the vacuum absorption port 38 may be further provided on a corner ridgeline, a ceiling surface, or a side surface of the convex casting mold 33. Of course the concave casting mold 32 may also have the vacuum absorption port 38 provided on a corner, a nook, a bottom surface, a side surface thereof. In addition, the vacuum absorption port 38 may be provided on a combination of a plurality of such positions. The number of positions of absorption ports need not be limited to one, and a plurality of absorption ports may be provided at positions which are symmetric relative to the casting mold so that air is uniformly vacuum exhausted. Similarly, a plurality of the absorption ports 39 of the holding absorption system (the absorption port 39 and flow path 40) used for holding the film may be provided on positions which are symmetry relative to the casting mold so that the film is uniformly vacuum adsorbed.

As thus described, an absorption port which absorbs a part of the film to become a flange in the flexible member 8 is provided on the casting mold. Accordingly, a manufacturing method of a flexible member capable of suppressing occurrence of wrinkles or deflection has been realized.

Fifth Embodiment

In the following, a fifth embodiment of the present invention will be described, referring to the drawings. Note that the basic configuration of the present embodiment is similar to that of the first embodiment and therefore only characteristic components will be described below.

Figure 11A:
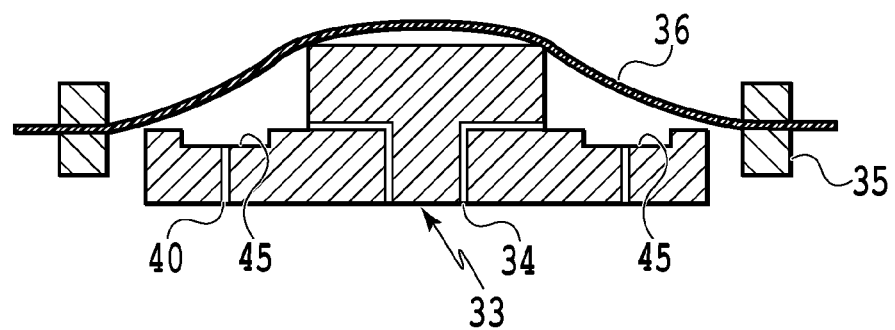
FIG. 11A illustrates a step of vacuum molding.
Figure 11B:
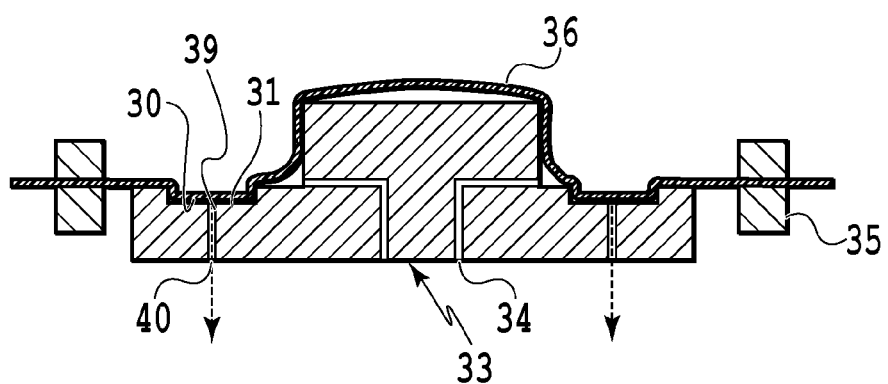
FIG. 11B illustrates a step of vacuum molding.

FIGS. 11A and 11B illustrate steps of vacuum molding in the present embodiment. In the present embodiment, as illustrated in FIG. 11A, a concave part 45 is provided on a part corresponding to the region (flange part) abutting the sealing member of the flexible member 8 in the convex casting mold 33. In the molding of the flexible member 8 in the convex casting mold 33 of the present embodiment, the first region of the film 36 is supported on the first surface of the convex casting mold 33, and the first region is absorbed by the absorption port. With such an arrangement, molding is performed by abutting of the film 36 with the second surface including an absorption port which is different from the first surface. Furthermore, the absorption port 39 and the flow path 40 being in communication with the absorption port 39 is provided on the convex part 45, as illustrated in FIG. 11B. Absorbing the film 36 in the convex part 45 at the time of molding results in holding and simultaneously vacuum molding the film 36 into a concave shaped. Molding in the aforementioned manner causes the part vacuum molded into a concave shape to become the sealing member abutting surface, and allows for increasing the planarity of the surface abutting the sealing member.

Sixth Embodiment

In the following, a sixth embodiment of the present invention will be described, referring to the drawings. Note that the basic configuration of the present embodiment is similar to that of the first embodiment and therefore only characteristic components will be described below.

Figure 12:
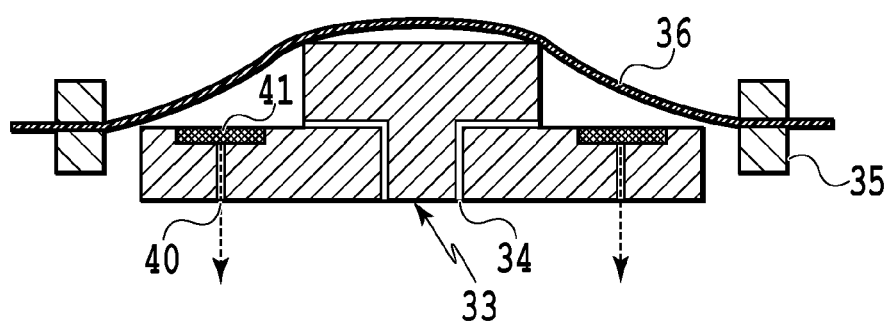
FIG. 12 illustrates a step of vacuum molding.

FIG. 12 illustrates a step of vacuum molding in the present embodiment. Although the present embodiment also performs absorption in the part corresponding to the region (flange part) abutting the sealing member of the flexible member 8 in the convex casting mold 33, a porous body 41 is provided in the absorbing part and the porous body 41 performs absorption of the film 36. The porous body 41 may be formed of sintered metal powder or foamed resin. Since the surface of the porous body 41 has been planarized, the sealing member abutting surface of the film 36 is molded into a plane while being adsorbed by the porous body 41.

When absorbing the film by the absorption port without using the porous body, there may be a case where the shape of the absorption port is transferred on the molded film depending on the strength of the absorption force. However, as with the present embodiment, absorbing the film 36 using the porous body 41 allows for increasing the planarity of the surface of the film abutting the sealing member regardless of the strength of the absorption force. Note that, besides a porous body, meshes or slits may be provided on the absorption port in accordance with the absorption force or the quality of material of the film. In the case of slits, it is preferred that the slits are arranged in parallel with the abutting sealing member (for example, O-ring).

As thus described, absorbing the film by the porous body allows for molding the surface of the film 36 having a higher planarity and abutting the sealing member.

Seventh Embodiment

In the following, a seventh embodiment of the present invention will be described, referring to the drawings. Note that the basic configuration of the present embodiment is similar to that of the first embodiment and therefore only characteristic components will be described below.

Figure 13:
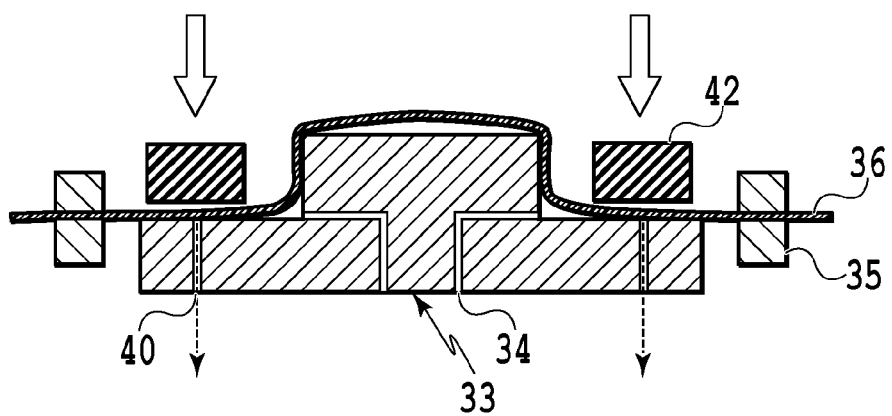
FIG. 13 illustrates a step of vacuum molding.

FIG. 13 illustrates a step of vacuum molding in the present embodiment. In the present embodiment, after having absorbed the part corresponding to the flange part of the flexible member 8 in the convex casting mold 33, pressure molding is performed by pressurizing the part by the casting mold 42. As thus described, combining absorption and pressurization allows for molding the surface of the film 36 having a higher planarity and abutting the sealing member.

Eighth Embodiment

In the following, an eighth embodiment of the present invention will be described, referring to the drawings. Note that the basic configuration of the present embodiment is similar to that of the first embodiment and therefore only characteristic components will be described below.

Figure 14:
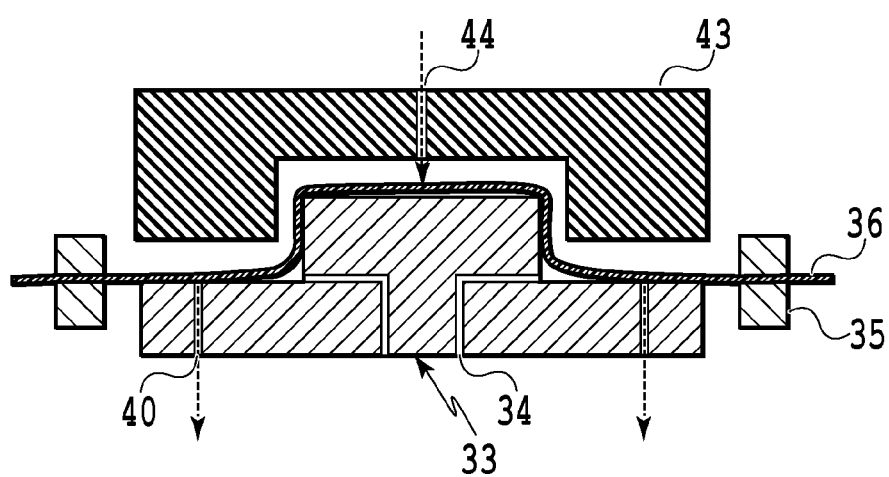
FIG. 14 illustrates a step of vacuum molding.

FIG. 14 illustrates a step of vacuum molding in the present embodiment. In the present embodiment, after having absorbed the part corresponding to the region (flange) abutting the sealing member of the flexible member 8 in the convex casting mold 33, pressure molding is performed by pressurizing the part by the casting mold 43 covering the casting mold 33. The casting mold 43 includes a pressurization port 44 capable of introducing compressed air into the mold after having closed the mold. Such a configuration allows for molding the surface of the film 36 having a higher planarity and abutting the sealing member by processing the film 36 by a combination of vacuum molding and pressure molding (blow molding). Note that the casting mold 43 may be heated and pressed by the casting mold 33 being at normal temperature.

Ninth Embodiment

In the following, a ninth embodiment of the present invention will be described, referring to the drawings. Note that the basic configuration of the present embodiment is similar to that of the first embodiment and therefore only characteristic components will be described below.

Figure 15:
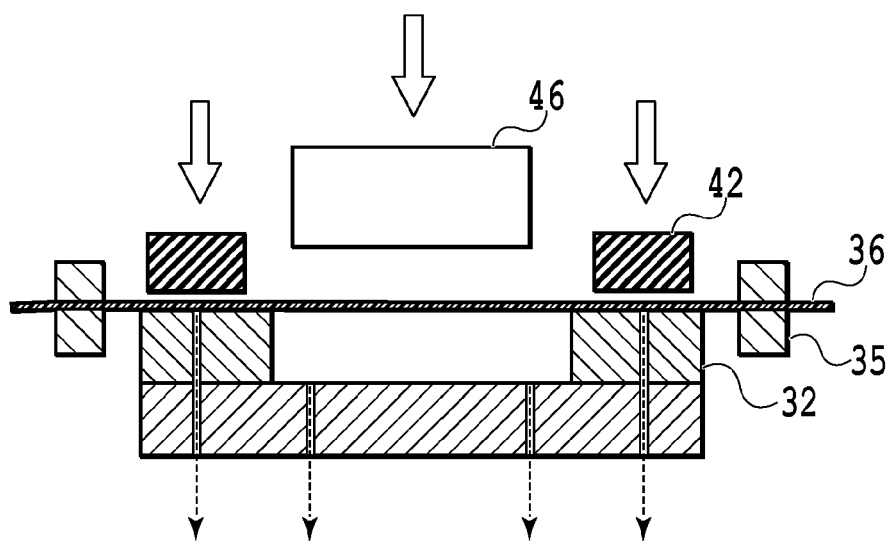
FIG. 15 illustrates a step of vacuum molding.

FIG. 15 illustrates a step of vacuum molding in the present embodiment. In the present embodiment, after having preliminarily heated the film at another position, the film is set to a state illustrated in FIG. 15. The film is pressurized and held by the casting mold 42 at normal temperature, while absorbing the part corresponding to the flange of the flexible member 8 in the concave casting mold 32. In this manner the part abutting the sealing member may be cooled first and cured, while being kept at a high planarity. On this occasion, there is no significant difference between absorbing or not absorbing the part corresponding to the flange, since it is immediately before starting film molding.

Next, molding is performed by absorption by the concave casting mold 32 at a temperature near normal temperature and pressing the heated plug 46 against the film 36. In terms of timing, it is preferred to perform the pressing operation by the plug 46 earlier, and the film is absorbed and molded by the concave casting mold 32 with the film having been heated and deformed. The plug 46 is lifted without terminating the absorption operation and, upon dropping of the film temperature, the absorption operation is terminated and the film is molded. In this manner it is possible to mold surface of the film 36 having a higher planarity and abutting the sealing member.

Other Embodiments

The embodiments described above may be combined as appropriate so as to perform vacuum molding. For example, the fifth and the sixth embodiments may be combined so as to form an absorption port on the convex part with a porous body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-171535, filed Sep. 6, 2017, No. 2017-210908, filed Oct. 31, 2017, and No. 2018-102556, filed May 29, 2018 which are hereby incorporated by reference wherein in their entirety.

What is claimed is:

1. An ejection material receiving unit comprising:
a first receiving space capable of receiving ejection material to be ejected from an eject head;
a second receiving space which is adjacent to the first receiving space and capable of receiving liquid; and
a flexible member separating the first receiving space and the second receiving space, wherein
the flexible member has a concave part which takes a concave shape in a state where the first receiving space is not filled with the ejection material and the second receiving space is not filled with the liquid, and
the concave shape is a shape dented toward the second receiving space from the first receiving space, and is also a shape conforming to a wall forming the second receiving space.

2. The ejection material receiving unit according to claim 1, wherein
the flexible member is capable of deforming into a convex shape conforming to the wall forming the first receiving space, as amount of ejection material received in the first receiving space decreases.

3. The ejection material receiving unit according to claim 2, comprising a groove which causes the first receiving space and an ejection head to be in communication when the flexible member has deformed into the convex shape.

4. The ejection material receiving unit according to claim 1, wherein
the second receiving space is configured to allow the liquid to be supplied to the space from outside.

5. The ejection material receiving unit according to claim 1, wherein
a corner of the concave part in the flexible member has a curved shape formed on the corner.

6. The ejection material receiving unit according to claim 1, wherein
a corner of the concave part in the flexible member has a tapered shape formed on the corner.

7. The ejection material receiving unit according to claim 1, wherein
the ejection material is imprint material.

8. The ejection material receiving unit according to claim 1, wherein
the flexible member includes a plurality of flexible members.

9. An ejection material ejecting apparatus comprising:
an ejection head; and
an ejection material receiving unit including:
a first receiving space capable of receiving ejection material to be ejected from the eject head;
a second receiving space which is adjacent to the first receiving space and capable of receiving liquid; and a flexible member separating the first receiving space and the second receiving space, wherein the flexible member has a concave part which takes a concave shape in a state where the first receiving space is not filled with the ejection material and the second receiving space is not filled with the liquid, and the concave shape is a shape dented toward the second receiving space from the first receiving space, and is also a shape conforming to a wall forming the second receiving space.

10. The ejection material ejecting apparatus according to claim 9, comprising a pressure control device connected to the second receiving space and configured to control pressure in the first receiving space.

11. The ejection material ejecting apparatus according to claim 10, wherein the pressure control device includes:

a main tank configured to store the liquid to be supplied to the second receiving space; and a sub tank configured to receive the liquid supplied to the sub tank from the main tank, and supply the liquid to the second receiving space.

12. The ejection material ejecting apparatus according to claim 10, including a mold configured to press ejection material ejected from the ejection head.

13. The ejection material ejecting apparatus according to claim 10, wherein the ejection material is imprint material.

14. The ejection material ejecting apparatus according to claim 10, wherein the flexible member is capable of deforming into a convex shape conforming to the wall forming the first receiving space, as amount of ejection material received in the first receiving space decreases.

15. The ejection material ejecting apparatus according to claim 10, wherein a corner of the concave part in the flexible member has a curved shape formed on the corner.

16. The ejection material ejecting apparatus according to claim 10, wherein a corner of the concave part in the flexible member has a tapered shape formed on the corner.

17. A manufacturing method of a flexible member, the flexible member abutting a sealing member provided in an aperture periphery of a receiving space capable of receiving fluid so as to cover the receiving space, wherein the flexible member has a region abutting the sealing member, and a region which is different from the region abutting the sealing member and has a convex part capable of deforming into a part covering the receiving space, the flexible member is manufactured by molding a film on a casting mold, a process of molding the film includes a first region molding step of holding a first region corresponding to the region abutting the sealing member of the film by the casting mold, and a second region molding step of forming a second region corresponding to the region having the convex part on the film by absorbing a region between the film and the casting mold.

18. The manufacturing method of a flexible member according to claim 17 comprising an absorption system configured to perform holding in the first region molding step by absorption, and perform absorption simultaneously with an absorption system in the second region molding step.

19. The manufacturing method of a flexible member according to claim 18, wherein, in the first region molding step, the first region is absorbed by an absorption port provided on a first part of the casting mold configured to mold the first region.

20. The manufacturing method of a flexible member according to claim 17, wherein, in the first region molding step and the second region molding step, the film is held by a clamp.

* * * * *